US009195441B2

(12) United States Patent
Adl-Tabatabai et al.

(10) Patent No.: US 9,195,441 B2
(45) Date of Patent: Nov. 24, 2015

(54) SYSTEMS AND METHODS FOR INCREMENTAL COMPILATION AT RUNTIME USING RELAXED GUARDS

(71) Applicant: Facebook, Inc., Menlo Park, CA (US)

(72) Inventors: Ali-Reza Adl-Tabatabai, San Jose, CA (US); Guilherme de Lima Ottoni, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 128 days.

(21) Appl. No.: 13/954,519

(22) Filed: Jul. 30, 2013

(65) Prior Publication Data

US 2015/0040110 A1  Feb. 5, 2015

(51) Int. Cl.
*G06F 9/44* (2006.01)
*G06F 9/45* (2006.01)
*G06F 9/455* (2006.01)

(52) U.S. Cl.
CPC *G06F 8/41* (2013.01); *G06F 8/443* (2013.01); *G06F 9/4552* (2013.01)

(58) Field of Classification Search
None
See application file for complete search history.

(56) References Cited

U.S. PATENT DOCUMENTS

| | | | |
|---|---|---|---|
| 7,493,610 B1* | 2/2009 | Onodera et al. | 717/155 |
| 7,536,682 B2* | 5/2009 | Dankel et al. | 717/139 |
| 7,574,700 B2* | 8/2009 | Bracha | G06F 9/44589 717/134 |
| 8,707,161 B2* | 4/2014 | Proctor et al. | 715/234 |
| 8,943,474 B1* | 1/2015 | Basumallik | G06F 9/4552 717/106 |
| 8,984,492 B2* | 3/2015 | Adl-Tabatabai | G06F 9/4552 717/130 |
| 9,098,299 B2* | 8/2015 | Adams | G06F 8/437 |
| 2004/0221278 A1* | 11/2004 | Dankel et al. | 717/139 |
| 2007/0288429 A1* | 12/2007 | Liu | G06F 17/30935 |
| 2011/0179347 A1* | 7/2011 | Proctor et al. | 715/234 |
| 2012/0054725 A1* | 3/2012 | Inglis et al. | 717/148 |
| 2013/0074052 A1* | 3/2013 | Adams et al. | 717/140 |
| 2014/0258998 A1* | 9/2014 | Adl-Tabatabai et al. | 717/158 |
| 2014/0282449 A1* | 9/2014 | Adl-Tabatabai et al. | 717/148 |
| 2014/0289716 A1* | 9/2014 | Adl-Tabatabai et al. | 717/146 |
| 2014/0289734 A1* | 9/2014 | Adams et al. | 718/104 |

(Continued)

OTHER PUBLICATIONS

Evans, J., "The HipHop Virtual Machine", Facebook Engineering [online], 2011 [retrieved Jan. 22, 2015], Retrieved from Internet: <URL: https://www.facebook.com/notes/facebook-engineering/the-hiphop-virtual-machine/10150415177928920>, pp. 1-6.*

(Continued)

*Primary Examiner* — Todd Aguilera
(74) *Attorney, Agent, or Firm* — Sheppard Mullin Richter & Hampton LLP

(57) ABSTRACT

Techniques provided herein facilitate just-in-time compilation of source code, such as a script, during execution. According to some embodiments, a tracelet is limited to a single basic block of code. The data types of variable values provided by one or more variables used in the single basic block of code are known by generalized categories, rather than only being known by specific data types. Accordingly, guard code associated with each tracelet, which ensures that variable values received by the tracelet though the variables are of the data types expected by the tracelet's associated code body, can use generalized data types. The tracelet can contain code body that can handle input values that meet those generalized data types. A generalized data type can be defined according to one or more common characteristics shared by two or more specific data types.

18 Claims, 8 Drawing Sheets

(56) References Cited

U.S. PATENT DOCUMENTS

2014/0331201 A1* 11/2014 Adl-Tabatabai et al. ..... 717/106
2015/0178051 A1* 6/2015 Miadowicz ............... G06F 8/31
                                                    717/118

OTHER PUBLICATIONS

Evans, J., "The HipHop Virtual Machine (hhvm) PHP Execution at the Speed of JIT", Facebook [online], 2012 [retrieved Jan. 26, 2015], Retrieved from Internet: <URL: http://cdn.oreillystatic.com/en/assets/1/event/80/The%20HipHop%20Virtual%20Machine_%20PHP%20Execution%20At%20The%20Speed%20Of%20JIT%20Presentation.pdf>, pp. 1-19.*

Franz, M., et al., "A Portable Virtual Machine Target for Proof-Carrying Code," Science of Computer Programming [online], vol. 57, No. 3, 2005 [retrieved Jan. 28, 2015], Retrieved from Internet: <URL: http://www.sciencedirect.com/science/article/pii/S0167642305000365>, pp. 275-294.*

Anonymous, "History for hhvm/hphp/runtime/vm/jit/guard-relaxation.cpp", GitHub [online], 2014 [retrieved on Aug. 20, 2015], Retrieved from Internet: <URL: https://github.com/facebook/hhvm/commits/master/hphp/runtime/vm/jit/guard-relaxation.cpp?page=3>, pp. 1-3.*

Gal A., et al., "Trace-based Just-in-Time Type Specialization for Dynamic Languages", Proceedings of the 30th ACM SIGPLAN Conf. on Programming Language Design and Implementation [online], 2009 [retrieved Aug. 20, 2015], Retrieved from Internet: <URL: http://www.vitromex.com.mx/assets/pdfjs/web/compressed.tracemonkey-pldi-09.pdf>, pp. 1-14.*

* cited by examiner

SYSTEMS AND METHODS FOR INCREMENTAL COMPILATION AT RUNTIME USING RELAXED GUARDS

FIELD OF THE INVENTION

The present application relates to compilation of source code and, in particular, incremental compilation of source code, such as script code, at runtime of the source code.

BACKGROUND

Generally, scripting languages may offer simplicity and ease in software development while retaining at least some of the functional complexity offered by non-scripting languages. Some scripting languages are based on a small set of expressions and statements that make them simple to learn and easy to use when writing scripts. Scripting languages are often used for rapid development of applications, such as web applications. Additionally, in client-server environments, scripting languages may be used to implement server-side programs, client-side programs, or both. Examples of scripting languages used on the server-side include PHP, PERL, and JAVA Server Page (JSP). Examples of scripting languages on the client-side include JAVASCRIPT and VBScript.

Server-side scripting is often used for implementation of interactive websites that interface with data stores for retrieving and storing information. Server-side script code can be used by a web server to dynamically generate a web page and provide the resulting web page to client devices in response to user request. For instance, a server-side script based on the PHP scripting language allows embedding of script code with hypertext markup language (HTML) on a web server to facilitate dynamic generation of web pages to be delivered to a client device. Client-side scripts, which may be included in web pages for rendering on client devices, can be used to perform operations on the client-side without sending a request to the server for such operations.

SUMMARY

Techniques provided herein facilitate just-in-time compilation of source code, such as a script, during execution. According to some embodiments, the just-in-time compilation comprises each tracelet being limited to a single basic block of code where the data types of values provided by one or more variables (hereafter, "variable values") used in the single basic block of code are known by generalized categories, rather than only being known by specific data types. Accordingly, guard code associated with each tracelet, which ensures that variable values received by the tracelet through input variables (hereafter, "variables") are of the data types expected by the tracelet's associated code body, can use generalized data type categories for variable value checks for variables and contain code body that can handle input values that meet those generalized data type categories. A generalized data type can be defined according to one or more common characteristics shared by two or more specific data types. In this regard, a generalized data type may encompass specific data types. Examples of generalized data type categories used can include reference-counted data types, non-reference-counted data types, character data types, numerical types, object data types, and non-object data types.

As used herein, a "tracelet" can refer to a basic block of code having one entry point and ending at a last instruction that changes control flow.

According to some embodiments, systems and methods can receive a request for executing a script. For example, a request for executing a script may be in response to a request from a user device to a web server. The systems and methods may be utilized by, or implemented at, a server that is configured to respond to a client. The systems and methods can identify a basic block of code (hereafter, the "basic block") in the script to be executed, where the basic block includes one or more variables that provide variable values to the basic block. The variables may include one or more untyped variables. The systems and methods can determine a set of data types corresponding to current variable values provided by the variables during current execution of the basic block of code. The set of data types may include at least one generalized data type encompassing a specific data type of at least one variable value provided by the variables. Accordingly, The at least one generalized data type may be more general than a specific data type of the at least one variable value. The systems and methods can generate an executable block of code (hereafter, the "executable block") for the basic block of code. The executable block of code can include a set of instructions configured to verify whether a set of subsequent variable values provided by the variables during subsequent execution of the basic block of code conforms to the set of data types. The executable block of code generated may be configured to be executed on a virtual machine or a central processing unit (CPU).

In some embodiments, the systems and methods can determine, based on analysis of the variables in the basic block of code, whether the set of data types can include one or more generalized data types for the current variable values provided by the variables during current execution of the basic block of code. This determination may be performed before determining the set of data types.

In some embodiments, the systems and methods can determine a set of specific data types corresponding to the current variable values provided by the variables during current execution of the basic block of code. This determination may be performed before determining whether the set of data types can include one or more generalized data types.

In some embodiments, the systems and methods can determine whether the set of data types can include one or more generalized data types by determining whether execution of the basic block of code involves modification of a reference count associated with at least one of the variables in the basic block.

In some embodiments, the systems and methods can determine whether the set of data types can include one or more generalized data types by translating the basic block of code to intermediate code configured to operate on an evaluation stack. Further, the systems and methods can determine whether the set of data types can include one or more generalized data types by determining an effect of the intermediate code on the evaluation stack. For some embodiments, the intermediate code may be byte code. Additionally, in some embodiments, the evaluation stack may be that of a virtual machine or an interpreter.

In some embodiments, the instructions may be further configured to verify whether the set of subsequent variable values provided by the variables conforms to the set of data types, before a portion of the executable block corresponding to the basic block of code is executed.

In some embodiments, if the set of subsequent variable values conforms to the set of data types, the set of instructions may be further configured to permit execution of the executable block to continue.

In some embodiments, if the set of subsequent variable values do not conform to the set of data types, the set of instructions may be further configured to exit the executable block before the executable block continues further execution.

For some embodiments, the executable block may exit to a second executable block corresponding to the basic block of code. The second executable block may include a second set of instructions configured to verify whether the set of subsequent variable values provided for the variables during subsequent execution of the basic block of code conforms to a second set of data types for variable values provided by the variables. The second set of data types may be different from the set of data types. The second set of data types may include at least one generalized data type encompassing a specific data type of a variable value provided by at least one of the variables. Alternatively, the second set of data types may be a set of specific data types.

For some embodiments, the executable block may exit to a second set of instructions that causes generation of a second executable block. The second executable block may be different from the executable block, where the second executable block may be compatible with a second set of data types corresponding to the set of subsequent variable values provided for the variables during subsequent execution of the basic block of code. The second executable block may be generated using the systems and methods described herein.

As described herein in further detail, the generalized data type may be at least one of a reference-counted data type, a non-reference-counted data type, an object data type, a non-object data type, a numeric object type, a non-numeric data type, a Boolean data type, a non-Boolean data type, a character data type, or a non-character data type.

In some embodiments, the operations of the systems and methods may be performed during just-in-time compilation.

In some embodiments, the systems and methods can store the executable block of code for execution during a subsequent execution of the basic block of code. For example, the stored executable block of code can be used (e.g., re-executed) in response to a subsequent request to execute the script, or where the basic block of code is repeatedly executed in under a conditioned loop.

In some embodiments, the systems and method described herein may be configured to handle scripts written in various programming languages, such as PHP, JAVASCRIPT, LISP, PERL, PYTHON, Awk, ACTIONSCRIPT, VBScript, Ruby, shell scripts (e.g., BASH, Korn shell, etc.), and the like. Additional examples of programming languages can include C, C++, JAVA, BASIC and the like. For some embodiments, the systems and method described herein may be configured to handle incremental compilation of programs other than scripts.

Many other features and embodiments of the invention will be apparent from the accompanying drawings and from the following detailed description.

Figure 1:
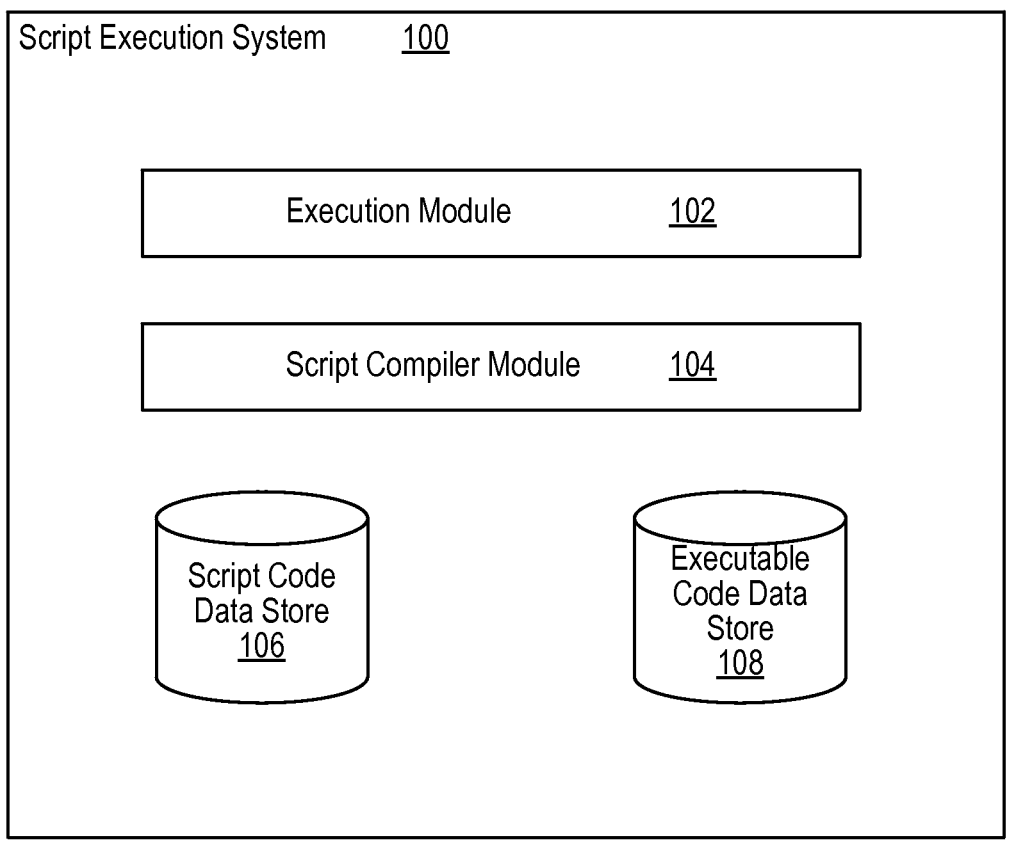
FIG. 1 illustrates an example script execution system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Scripting languages are often associated with interpreted languages, which use an interpreter or a virtual machine to execute code based on such languages directly before compilation. Conventional approaches to execute script code include executing the script code using an interpreter. However, an interpreter may not be able to perform several optimizations that a compiler that generates executable code can perform. For example, interpreting script code can be inefficient compared to running executable code obtained by compiling the script code. Scripting languages, and other interpreted languages, often support untyped variables that do not require a user to provide type information of the variable. Consequently, a compiler processing script code may not have the required information needed for performing certain optimizations. Compiler optimizations, for example, may require knowledge of data types of the variables that is not available in script code based on untyped variables. Even if the knowledge of data types is available, the compilation techniques, especially just-in-time compilation techniques, may not generate optimal executable code for a particular execution instance.

According to some embodiments, the systems and methods are provided that can facilitate incremental compilation of a script code in a script, at script runtime, to generate executable code, which may be optimized for execution irrespective of usage of untyped variables in the script code. During script runtime, the systems and methods can compile basic blocks of code (hereafter, the "basic blocks") in the script to executable blocks of code (hereafter, the "executable blocks") as needed for execution of the script.

For some embodiments, the basic block may be one having one entry point, where no instruction within the basic block other than the entry point can be reached from anywhere in the script code as a destination of a jump instruction. The entry point may be the first instruction of the basic block. Additionally, for some embodiments, the basic block of code may be one having one entry point and ending at a last instruction that changes control flow of execution. As used herein, a "tracelet" can refer to a basic block of code having one entry point and ending at a last instruction that changes control flow. The last instruction of a basic block can evaluate a certain condition and determine the next basic block for execution based on the result of the condition evaluation. For example, the last instruction may be one that results in one or more exit points from the basic block.

For some embodiments, the executable blocks of code resulting from the basic block can be executed faster or with more efficiency than executing the basic block of code without compilation. Additionally, the executable blocks that result may be created to be compatible with, optimized for, or otherwise expecting execution under certain script runtime conditions. Once an executable block has been created based on a set of runtime conditions and stored (e.g., in an executable block of code data store), that executable block can be used and reused when the basic block of code corresponding to the executable block is subsequently executed and the set of runtime conditions are satisfied.

To ensure proper execution, the executable blocks of codes can include a set of instructions configured to verify whether a set of criteria, based on the runtime conditions under which the executable block was created, are satisfied before the executable block is executed. Such instructions may be referred to herein as "guard code." During script runtime, when the set of criteria of an executable block is not satisfied, the executable block may transfer control (e.g., exit) to: (a) another executable block that may be suited for the current runtime conditions; or (b) a process that generates another executable block that is compatible with, optimized for, or otherwise expecting execution under the current runtime conditions.

As used herein, "relaxed guard code" can refer to guard code that verifies a set of criteria that is broader or more relaxed than that it otherwise would be given the runtime conditions under which the executable block, associated with the guard code, was created. Take for example where the runtime conditions, under which an executable block was generated, involve the passing of numeric variable values to the executable block. Rather than associating the executable block with guard code that verifies (before the executable block is used) that variable values being passed to the executable block are numeric data types, the executable block can be associated with relaxed guard code that verifies that the variable values being passed are non-object data types, which can encompass numeric data types.

According to various embodiments, the runtime conditions verified by the guard code of an executable block can include the specific data types of variable values being provided by the variables in the basic block of code. This may be particularly beneficial where the variables are untyped variables. As such, for some embodiments, the executable blocks can include guard code configured to verify whether the variable values provided by the variables (in the basic block of code) conform to a set of specific data types expected by the executable block of code (e.g., for compatibility or optimization purposes). Examples of specific data types can include but are not limited to Boolean, integer, float, double, character, string, and object.

In some embodiments, the guard code included in an executable block of code can be relaxed when it is determined that the executable block of code can be applicable to, or compatible with, runtime conditions different from those under which the executable block of code was created. For some embodiments, a relaxation of the guard code can be performed based on an analysis performed on the basic block of code before the executable block of code is generated. For example, the analysis may be performed on the basic block before it is compiled into the executable block. Further, the analysis may comprise translating the basic block of code to intermediate code (e.g., byte code) and evaluating the effect of the intermediate code on an evaluation stack. According to some embodiments, a basic block of code may be translated to intermediate code, and the intermediate code may be compiled to an executable block of code corresponding to the basic block of code.

In accordance with various embodiments, the relaxation of guard code can apply to verification of data types of variable values being provided to an executable block of code by variables of the basic block of code. For instance, where applicable, a particular executable block of code may include relaxed guard code configured to verify whether variable values provided by (e.g., stored in) the variables of the basic block conform to a set of data types that includes at least one generalized data type that encompasses specific data types of the variable values.

The inclusion of such guard code may be based on an analysis of the variables in the basic block of code. During creation of an executable block of code at runtime, such an analysis can determine whether the guard code can be configured to verify whether the variable values provided by the variables (in the basic block of code) conform to a set of data types including one or more generalized data types for corresponding variable values.

In one example, an executable block of code may have been created at runtime based on a basic block of code that received an integer value in one of its untyped variables. It may be determined, from an analysis of the untyped variable in the basic block, that the executable block created is compatible with the untyped variable receiving values other than just integer values (e.g., all numeric values). Accordingly, the guard code included in the executable block corresponding to basic block may be configured to permit execution of the executable block when the untyped variable receives variable values other than integer values.

As describe herein, examples of generalized data type used can include but are not limited to reference-counted data types, non-reference-counted data types, character data types, numerical types, object data types, and non-object data types.

According to some embodiments, the analysis of the variables in the basic code may comprise analyzing the effect of the basic block of code, on the evaluation stack of an interpreter or virtual machine, during execution of basic block of code. In some embodiments, such an analysis may involve the basic block of code being translated to byte code, and the effects of the byte code being evaluated with respect to the evaluation stack. In certain embodiments, analysis of the variables in the basic code may determine whether a variable is reference counted. For some embodiments, a set of data types in guard code may include generalized data types for variable values of those variables that are not reference counted.

By verifying whether variable values provided by the variables in the basic block of code conform to a set of data types including a generalized data type, the systems and methods of some embodiments can produce executable blocks of code that can be used and reused for runtime conditions different to those under which they were generated. As such, less executable blocks of code need to be generated to handle different data types of variable values during runtime. With relaxed guard code, an executable block of code can provide for better code locality.

FIG. 1 illustrates an example script execution system 100 in accordance with an embodiment of the invention. For some embodiments, the script execution system 100 may be configured to execute a script using incremental compilation of the script at runtime. Additionally, the script execution system 100 may be invoked to execute a script upon a request from a client user device. The script execution system 100 may include an execution module 102, a script compiler module 104, a script code data store 106, and an executable code data store 108. The components shown in this figure and all figures herein are exemplary only, and other implementations may include additional, fewer, or different components. Some components may not be shown so as not to obscure relevant details.

The execution module 102 may execute the executable code for a script selected for execution. The execution module 102 may be configured to identify, in the script, basic blocks of script code that need to be executed during an execution instance of the script. When identifying basic blocks of the script for execution, the execution module 102 may search the executable code data store 108 for previous compilations of executable block that may correspond to the identified basic block and the set of data types corresponding to the variable values provided by the variables in the basic block.

As described herein in further detail, where an executable block does not exist or is not identified for a given basic block to be executed, the execution module 102 may invoke and utilize the script compiler module 104 to generate an executable block for the given basic block. The basic block, and therefore the corresponding executable block, may be identified based on the original request for script execution received by the script execution system 100. Such a request may comprise variable values of varying data types, which may determine the executable block utilized to execute the corresponding basic block. The script code for a given script to be executed may be stored at and retrieved from the script code data store 106.

Script code typically supports features that make it difficult to generate efficient executable code. For example, script code may support an untyped variable for which the type is not available until runtime. Programmers may use untyped variables since they do not require the programmer to make early decisions regarding types of variables used. A programmer may specify a variable as untyped even if at runtime the variable only stores variable values of one particular type, for example, an integer value.

When invoking the script compiler module 104, the execution module 102 may provide data type information of variable values provided by variables and obtained during the current execution of the script code. When subsequent execution of the script provides a set of variable values having a different combination of data types, the script compiler module 104 may generate an executable block configured to handle the different combination of data types.

The execution module 102 may request compilation of one basic block of code at a time. For instance, the execution module 102 may request the script compiler module 104 to compile one basic block for a particular combination of data types for the variable values of the variables.

The script compiler module 104 may, at the instruction of an execution module 102, obtain script code from a script code data store 106, in source code form, and generate equivalent code for execution by the execution module 102. In accordance with some embodiments, the script compiler module 104 may perform incremental compilation of script code, at runtime of the script. The basic blocks of the script code may be compiled into executable blocks of code, as needed during execution of the script. The executable blocks of code generated may be compatible, optimized for, or otherwise configured to expect variable values of a set of data types through variables used in the basic blocks of code. To ensure that the variable values are as expected, a basic block of code can be compiled into an executable block of code that includes guard code configured to verify data types of variable values received by the basic block through variables. In certain instances, the guard code can be relaxed by accommodating one or more generalized data types, which permit a given executable block of code to be used and reused for variable values having a different combination of data types. The execution module 102 may identify those basic blocks of code in script that need to be compiled during execution of a script, and may provide the script compiler module 104 with the address of those identified basic code (or their related intermediate code). The execution module 102 may provide the script compiler module 104 with runtime information regarding the current execution of the script, whereby the runtime information may be utilized in compiling the basic block of script code in the script to an executable block of code.

As basic blocks of code are compiled by the script compiler module 104, the resulting executable blocks can be stored on the executable code data store 108. The executable code data store 108 can be configured to provide stored executable blocks of code to the execution module 102 during subsequent execution of the script or subsequent execution of the basic blocks corresponding to the executable blocks.

For some embodiments, the script compiler module 104 may compile a basic block of code by first translating it to an intermediate code, such as byte code, and then compiling the intermediate code to an executable block of code. Alternatively, the executable block may be generated directly from script code without requiring byte code generation.

Figure 2:
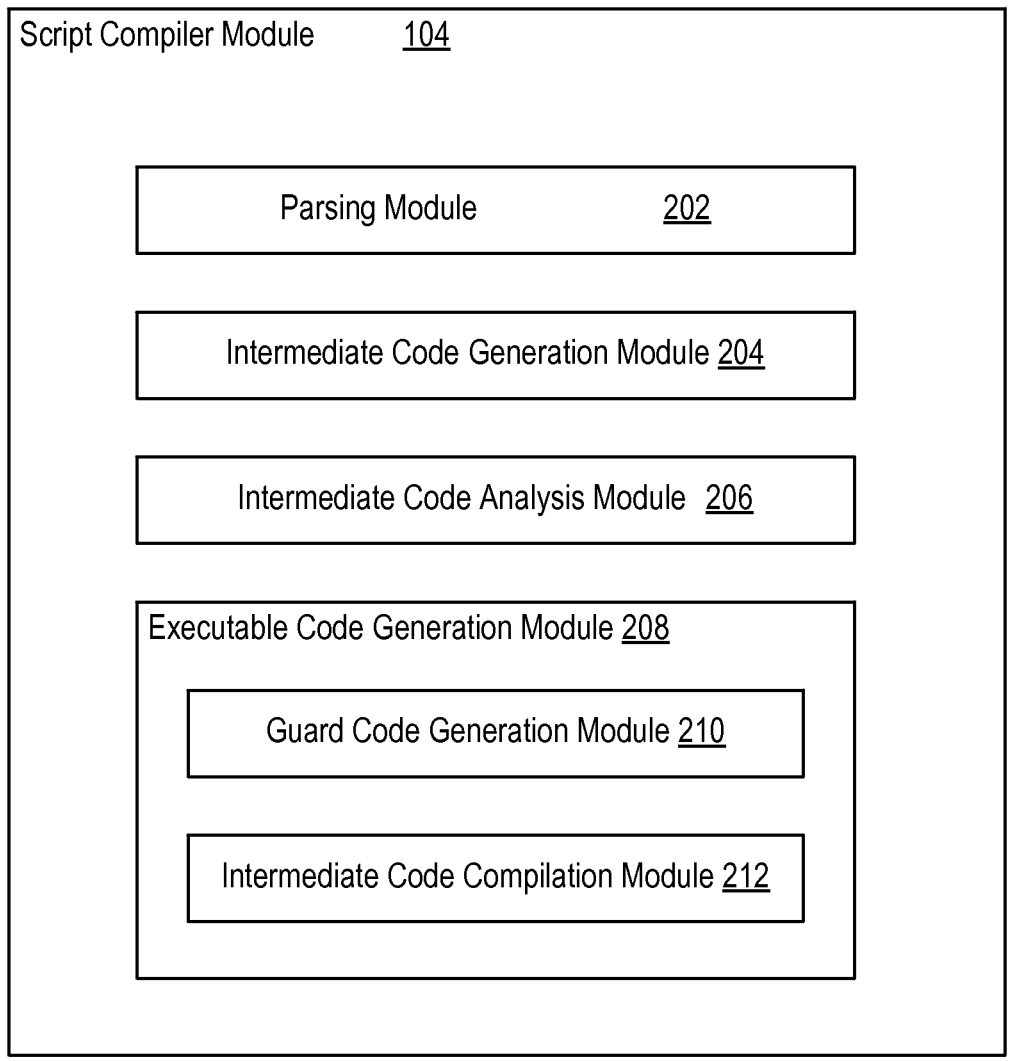
FIG. 2 illustrates an example script compiler module in accordance with an embodiment of the invention.

FIG. 2 illustrates an example script compiler module 104 in accordance with an embodiment of the invention. For some embodiments, the script compiler module 104 may be configured to incrementally compile basic blocks of script code in a script during script runtime. As described herein in further detail, the script compiler module 104 may be invoked, by the execution module 102, to generate a new executable block of code corresponding to an identified basic block of code and compatible with the current variable values provided by variables of the basic block during script runtime. The execution module 102 may do so when an identified basic block of code to be executed lacks a corresponding executable block of code compatible with the current variable values provided by the variables. When the script compiler module 104 is invoked by the execution module 102, the execution module 102 may provide the script compiler module 104 with runtime information useful in compiling the identified basic block to the executable block. The script compiler module 104 may include a parsing module 202, an intermediate code generation module 204, an intermediate code analysis module 206, and an executable code generation module 208.

The parsing module 202 may be configured to read basic block of code and build a data structure that facilitates the compilation of the basic block to an executable block of code. In some embodiments, the data structure may be an abstract syntax tree (AST), which is a hierarchical tree representation of the basic block of code. The script compiler module 104 may utilize a data structure, such as AST, to translate the basic block of code to intermediate code, which in turn may be compiled to an executable block of code. The parsing module 202 may read the basic block of code from one or more files in the script code data store 106.

The intermediate code generation module 204 may be configured to generate intermediate code from the basic block of code identified for compilation and execution by the execution module 102. In some embodiments, the intermediate code generation module 204 may traverse a data structure produced by the parsing module 202 (e.g., AST) and generate intermediate code corresponding to the basic block and based on the data structure. As described herein in further detail, the intermediate code may be byte code, which may be configured to be operable with a virtual machine or an interpreter. As also noted herein, the intermediate code may be utilized to determine the effect of variables in the basic block on an evaluation stack of a virtual machine or an interpreter.

The intermediate code analysis module 206 may be configured to analyze an effect of the intermediate code on the evaluation stack. As described herein in further detail, based on the analysis of intermediate code, a set of data types can be determined that will be included in guard code of the executable code to be generated. In some embodiments, the intermediate code analysis module 206 may determine that the intermediate code results in the reference count, associated with variables in the basic block, being changed. For example, with respect to script code based on PHP, the intermediate code analysis module 206 may analyze or monitor execution of evaluation stack commands that result in reference count changes with respect to variables in the basic block code, including CGetL and SetL. In some embodiments, where the variables used in the basic block of code are used such they are not reference counted, the set of data types included in the guard code can be relaxed and generalized. In various embodiments, other analysis findings relating to the basic block of code may be utilized to determine when criteria verified in guard code can be relaxed.

The executable code generation module 208 may be configured to generate executable code for an identified basic block of code. The executable code generation module 208 may include a guard code generation module 210 and an intermediate code compilation module 212. The guard code generation module 210 may be configured to generate guard code for the executable block of code. As described herein in further detail, the analysis of the basic block of code, or its corresponding intermediate code, can help determine whether the guard code can be relaxed such that the executable block of code to be generated can be utilized for a wider variety of runtime conditions. For example, the guard code may be relaxed such that the executable block of code generated can be used with variable values corresponding to different combinations of data types. The intermediate code compilation module 212 may be configured to compile intermediate code to an executable block of code. Once generated, the executable block of code may be stored to the executable code data store 108.

In some embodiments, the executable code generation module 208 may generate executable block of codes directly from the basic block of code without the need for first translating the basic block of code to intermediate code.

Figure 3:
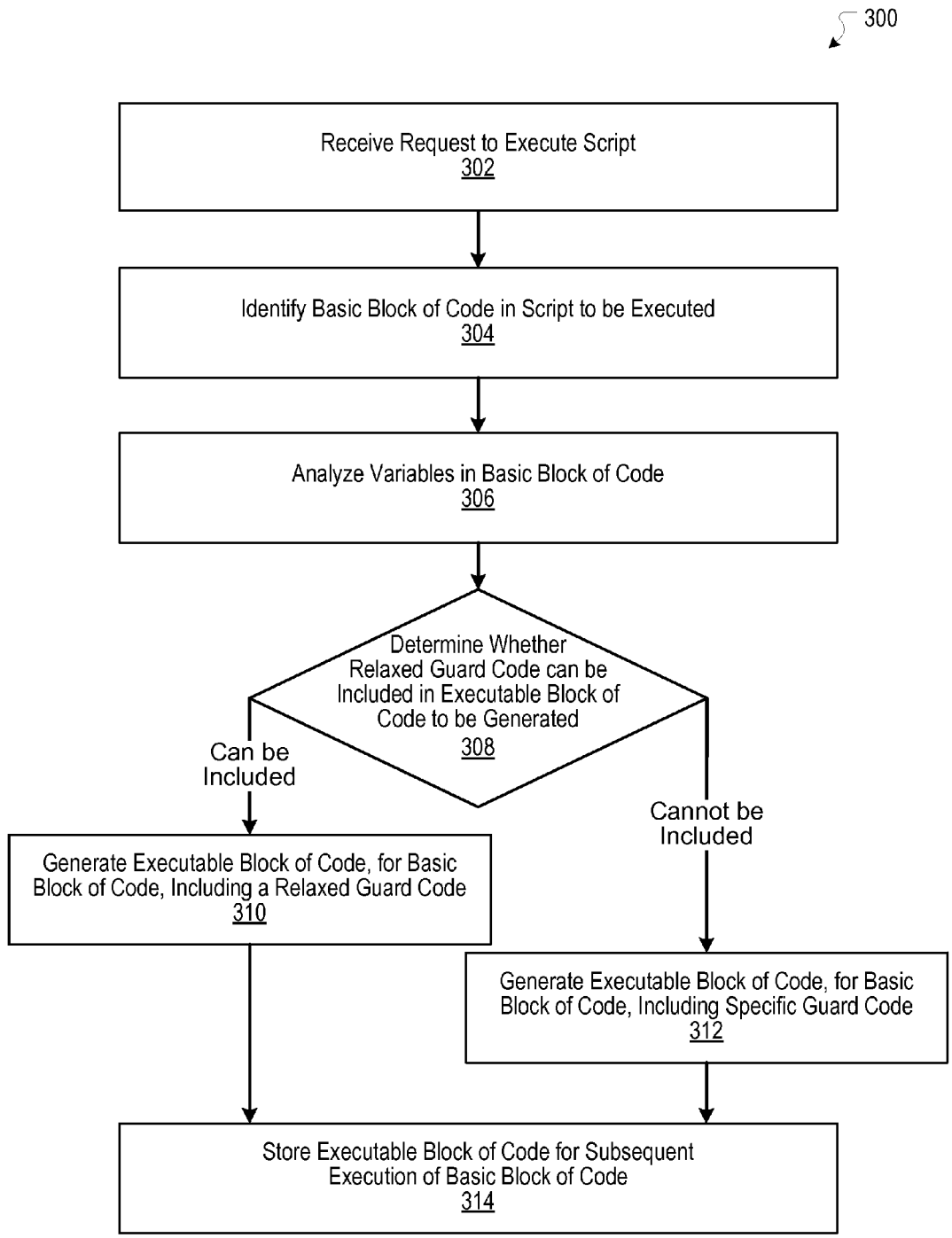
FIG. 3 illustrates an example process for incremental compilation during script execution in accordance with an embodiment of the invention.

FIG. 3 illustrates an example process 300 for incremental compilation during script execution in accordance with an embodiment of the invention. According to some embodiments, the process 300 may be one performed by the script execution system 100. The process 300 may begin at step 302 with receiving a request to execute a script. For example, the script execution system 100 may receive a request to execute script from a user client device, or from a web server requesting execution of a script in connection with serving a web page the web server is providing to a user client device.

A step 304, the process 300 may identify a basic block of code in the script to be executed, the basic block including one or more variables that provide input values to the basic block. For instance, the execution module 102 may identify the basic block of code in the script to be executed based on the current runtime. At least one of the variables included in the script may be an untyped variable.

At step 306, the process 300 may analyze the variables in the script. For example, the guard code generation module 210 may perform an analysis on the variables in the script. For some embodiments, the analysis may comprise analyzing whether execution of the basic block of code involves modification of a reference count associated with at least one of the variables in the basic block. In some embodiments, the analysis may comprise the intermediate code generation module 204 translating the basic block of code to intermediate code (e.g., byte code) configured to operate on an evaluation stack. The analysis may further comprise the intermediate code analysis module 206 determining an effect of the intermediate code on the evaluation stack. The evaluation stack may be part of a virtual machine or interpreter.

At decision point 308, the process 300 may determine, based on analysis of the variables in the basic block of code, whether a set of data types can include one or more generalized data types for corresponding variable values provided by the variables. In some embodiments, the guard code generation module 210 may perform the determination of whether the set of data types can include one or more generalized data types.

If one or more generalized data types can be included in the set of data types, at step 310, the process 300 may generate an executable block of code for the basic block of code, where the executable block of code includes relaxed guard code configured to verify whether a set of variable values provided by the variables conform to the set of data types including the one or more generalized data types. In some embodiments, the intermediate code compilation module 212 may generate from intermediate code the executable code for the basic block generated by the intermediate code generation module 204. In some embodiments, the guard code generation module 210 may generate the relaxed guard code configured to verify whether a set of variable values provided by the variables conform to the set of data types including the one or more generalized data types.

If one or more generalized data types cannot be included in the set of data types, at step 312, the process 300 may generate an executable block of code for the basic block of code, where the executable block of code includes specific guard code configured to verify whether a set of variable values provided by the variables conform to the set of specific data types. In some embodiments, the intermediate code compilation module 212 may generate, from intermediate code, the executable code for the basic block generated by the intermediate code generation module 204. In some embodiments, the guard code generation module 210 may generate the specific guard code configured to verify whether a set of variable values provided by the variables conform to the set of specific data types.

At step 314, the process 300 may store the executable block of code (e.g., to the executable code data store 108) for execution during a subsequent execution of the basic block of code. For example, the stored executable block of code can be used (e.g., re-executed) in response to a subsequent request to execute the script, or where the basic block of code is repeatedly executed in under a conditioned loop.

Figure 4:
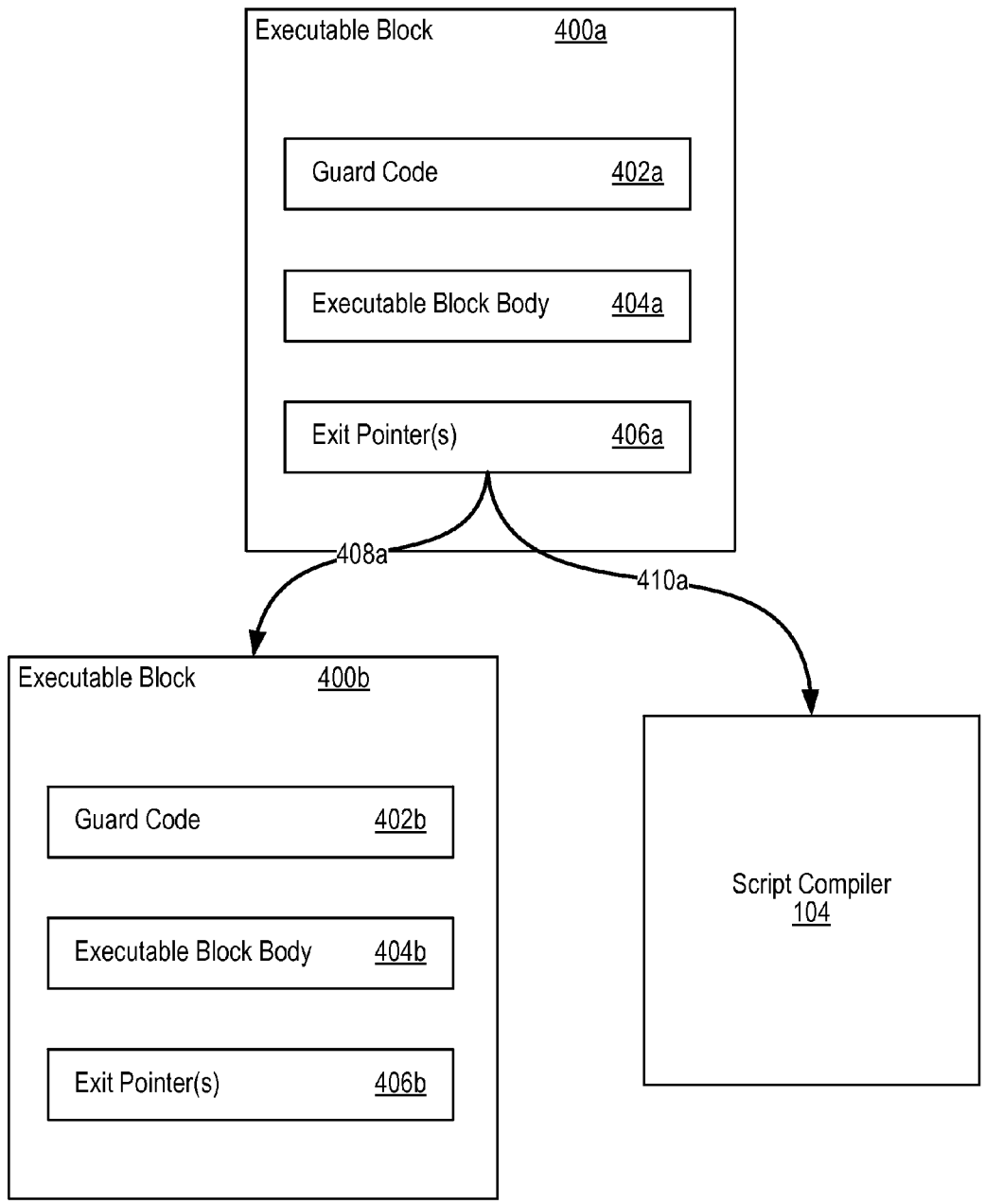
FIG. 4 illustrates an example structure for an executable block of code in accordance with an embodiment of the invention.

FIG. 4 illustrates an example structure for an executable block 400a of code in accordance with an embodiment of the invention. The executable block 400a may include a portion of guard code 402a, an executable block body 404a, and one or more exit pointers 406a. The executable block 400a may be generated in response to receiving a request (e.g., from a client user device) to execute a script containing a basic block of code corresponding to the executable block 400a. Accordingly, the executable block 400a may be optimized for a set of data types corresponding to variable values provided by variables of the basic block of code. The variable values provided by the variables may be based on the request received to execute the script.

The following example illustrates how the executable block 400a of code may be generated for a given basic block of code of a script. Assume that a basic block includes two untyped variables varA and varB, and that for a particular execution of the script, it is determined that both variables varA and varB are providing integer values. The intermediate code compilation module 212 may compile the basic block to generate the executable block body 404a that assumes the variables varA and varB are providing integer values. The guard code 402a may include instructions that check a particular condition (e.g., a runtime condition) before executing the executable block body 404a. In this example, the guard code 402a generated by the guard code generation module 210 can verify that the data types of variable values provided by variables varA and varB are integer values. If the data types of variable values provided by both variables are integer values, the guard code 402a permits the executable block body 404a to continue execution.

In accordance with some embodiments, if the data types of variable values provided by both variables are not integer values, the guard code 402a may be relaxed. Analysis of the executable block body 404a, or the basic block of code corresponding to the executable block body 404a, may result in the guard code 402a being relaxed such that it verifies that the data types of variable values, provided by one or both of variables varA and varB, are data types broader than integer values. As another example, if an analysis of the executable block body 404a, or the basic block of code, determines that varA and varB, as used in the executable block body 404a, are not referenced counted, the guard code 402a may be relaxed to accommodate values of varA and varB that are not limited to reference counted values.

The last instruction of an executable block 400a that is executed may cause control flow to begin execution of another executable block 400b, which may include its own guard code 402b, executable block body 404b, and exit pointer 406b. Accordingly, the last instruction of the executable block 400a may include one or more exit pointers 406a, one of which may specify the address of the executable block 400b for execution after the execution of the executable block 400a. The last instruction of the executable block 400a that is executed may, for example, transfer control to different executable blocks depending on certain criteria. For instance, the last instruction in a basic block may correspond to an 'if' condition that executes one basic block if the condition is evaluated to be true and another basic block if the condition is evaluated to be false. As a result, the last instruction of the executable block 400a may include one or more exit pointers 406a.

As shown, an exit pointer 408a of the exit pointers 406a can point to the other executable block 400b. If a particular executable block that needs to be executed subsequent to the execution of the executable block 400a has not been compiled from a basic block so as to generate a corresponding executable block, an exit pointer 410a of the exit pointers 406a points can transfer control to the script compiler module 104. The script compiler module 104 may be provided with information describing the subsequent basic block (or its intermediate code) that needs to be compiled. The address of the subsequent basic block may be communicated to the script compiler module 104 using function-calling conventions of the native machine in which the system is hosted. In some embodiments, the script compiler module 104 may obtain the address of intermediate code (e.g., byte code) corresponding to the subsequent basic block to be compiled from the top of the stack. Once the script compiler module 104 generates an executable block corresponding to the subsequent basic block, the exit pointers 406a can be changed to point to the newly generated executable block instead of the script compiler module 104.

In some embodiments, the script compiler module 104 may generate different executable blocks for different combinations of data type of variable values provided by the variables of a basic block. That is, the script compiler module 104 may generate one executable block to handle integer values provided by variables of the basic block, another executable block to handle float values provided by variables of the basic block, and yet another executable block to handle one integer value and one float value provided by variables of the basic block. In accordance with some embodiments, two or more of the executable blocks generated may be replaced by a single executable block having a relaxed guard code configured to handle a variety of variable value combinations provided by the variables of the basic block.

In particular embodiments, the executable blocks may be generated based on criteria other than just the data type of variable values being provided by variables in the basic block. For example, the executable blocks may be generated based criteria relating to other aspects of the runtime environment in which script is being executed, such as the script's current usage of memory in the runtime environment. In such an example, the guard code may comprise instructions to verify criteria relating to the script's current usage of memory in the runtime environment.

Figure 5:
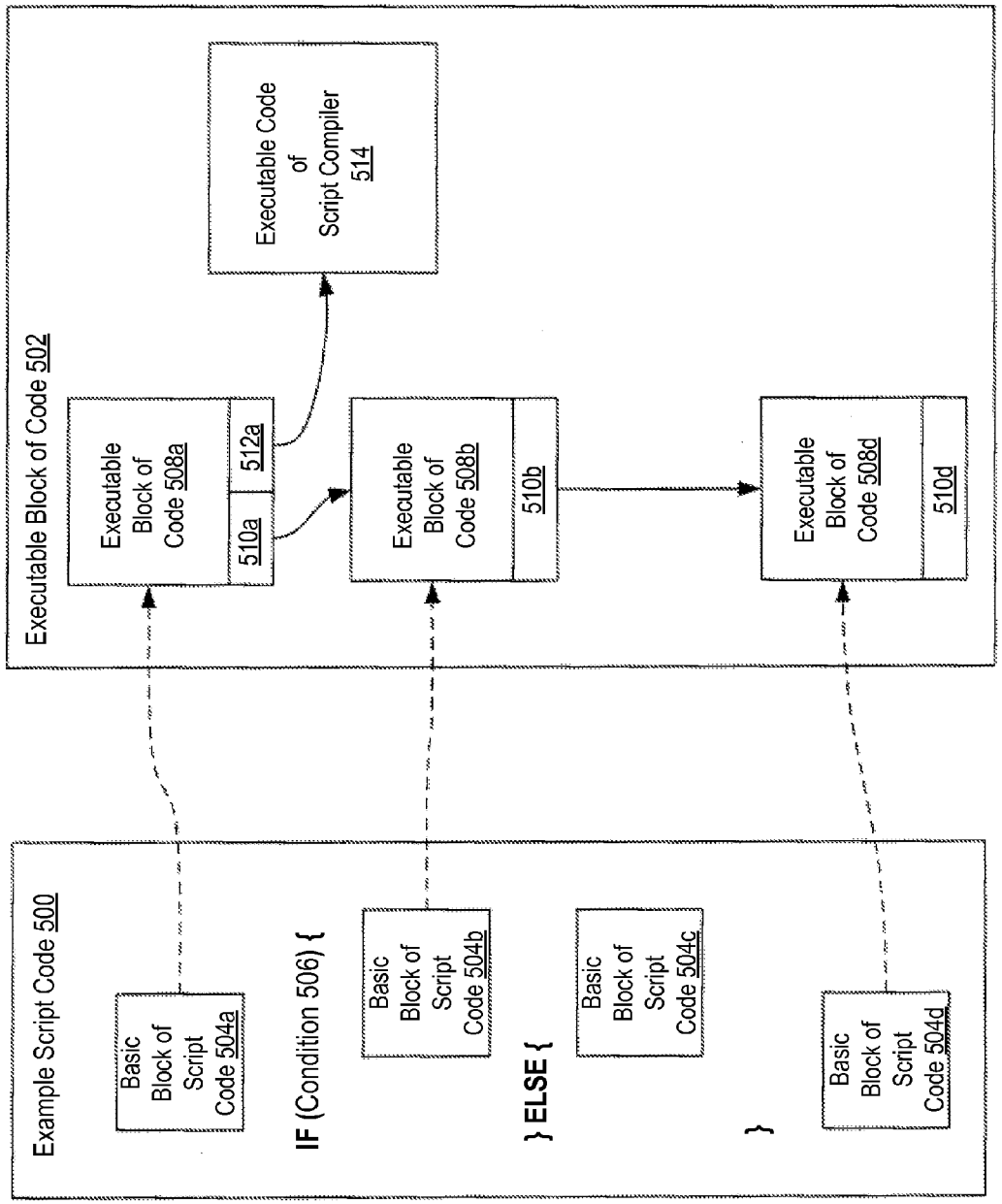
FIG. 5 illustrates an example of incremental compilation during script execution in accordance with an embodiment of the invention.

FIG. 5 illustrates an example of incremental compilation during script execution in accordance with an embodiment of the invention. FIG. 5 shows an example script code 500, which may be executed in response to a request from a client user device. As shown, the example script code 500 may include a basic block of script code 504a followed by an if-then-else statement, followed by another basic block of script code 504d. The if-then-else statement may include a condition 506, a basic block of script code 504b that is executed if condition 506 evaluates to true, and a basic block of script code 504c that is executed if the condition 506 evaluates to false.

Assume that a request is received from a client user device that includes variable values for variables of the example script code 500 that result in the condition 506 evaluating to true. The resulting executable code generated from the example script code 500 by the script compiler module 104 can include an executable block of code 502. The script code 504a combined with the condition 506 can correspond to an executable block of code 508a. The executable block of code 508a can include a guard code in the beginning to verify whether the data types of variable values, provided by the variables of the basic block of script code 504a, correspond to a specific combination. The end of the executable block of code 508a may include instructions evaluating the condition 506. If the condition 506 evaluates to true, the control flow may be transferred according to exit pointer 510a, and otherwise the control flow may be transferred according to exit pointer 512a.

If the condition 506 evaluates to true, an executable block 508b corresponding to the basic block of script code 504b may also be generated. The control flow may be transferred from the executable block 508b according to exit pointer 510b. The example script code 500 shows that after the basic block of script code 504b, the basic block of script code 504d may be executed. Accordingly, an executable block of code 508d corresponding to the basic block of script code 504d may also be generated. The control flow may be transferred from the executable block 508d according to exit pointer 510d. The basic block of script code 504c may never be executed since it corresponds to the 'else' portion of the if-the-else statement that is not executed when the condition 506 evaluates to true. Accordingly, the end of the executable block of code 508a includes the exit pointer 512a pointing to executable code 514 of the script compiler module 104 and providing the script compiler module 104 with information identifying to the basic block of script code 504c (or its corresponding intermediate code).

If a subsequent request includes variable values for variables where the data types of the variable values match those corresponding to the previous request and that result in the condition 506 evaluating to true, the executable block of code 508b can be executed to process this request. A new set of executable blocks of code may be generated if a request is received that requires execution of the example script code 500 with a set of variable values having a new combination of data types, different from those corresponding to a previously generated executable block of code.

If at any stage, an execution of the script code 500 is performed that provides variable values for the variables where the data types of the variable values match those corresponding to the previous request and causes the condition 506 to evaluate to false, the exit pointer 512a may cause the script compiler module 104 to be invoked causing an executable block to be generated corresponding to the basic block of script code 504c. The script compiler module 104 may change the exit pointer 512a to point to the generated executable block (not shown) instead of the script compiler module 104. Since the execution of the basic block of script code 504c may be followed by the execution of the basic block of script code 504d, the exit pointer at the end of the executable block generated for the basic block of script code 504c may be configured to point to the executable block of code 508d corresponding to the basic block of script code 510d. The executable block of code 502 may now include the executable block corresponding to the basic block of script code 504c and may be able to process requests that result in the condition 506 evaluating to true as well as false without having to invoke the script compiler module 104. Furthermore, the executable block corresponding to the basic block of script code 504c may not be generated unless an execution that causes the condition 506 to evaluate to false is received. Accordingly, the script compiler module 104 may generate executable code in a "lazy" fashion, where generation may only be performed if a request requires certain portion of the script code to be executed. As a result, the script compiler module 104 may not generate dead code, i.e., code that has never been executed.

Figure 6:
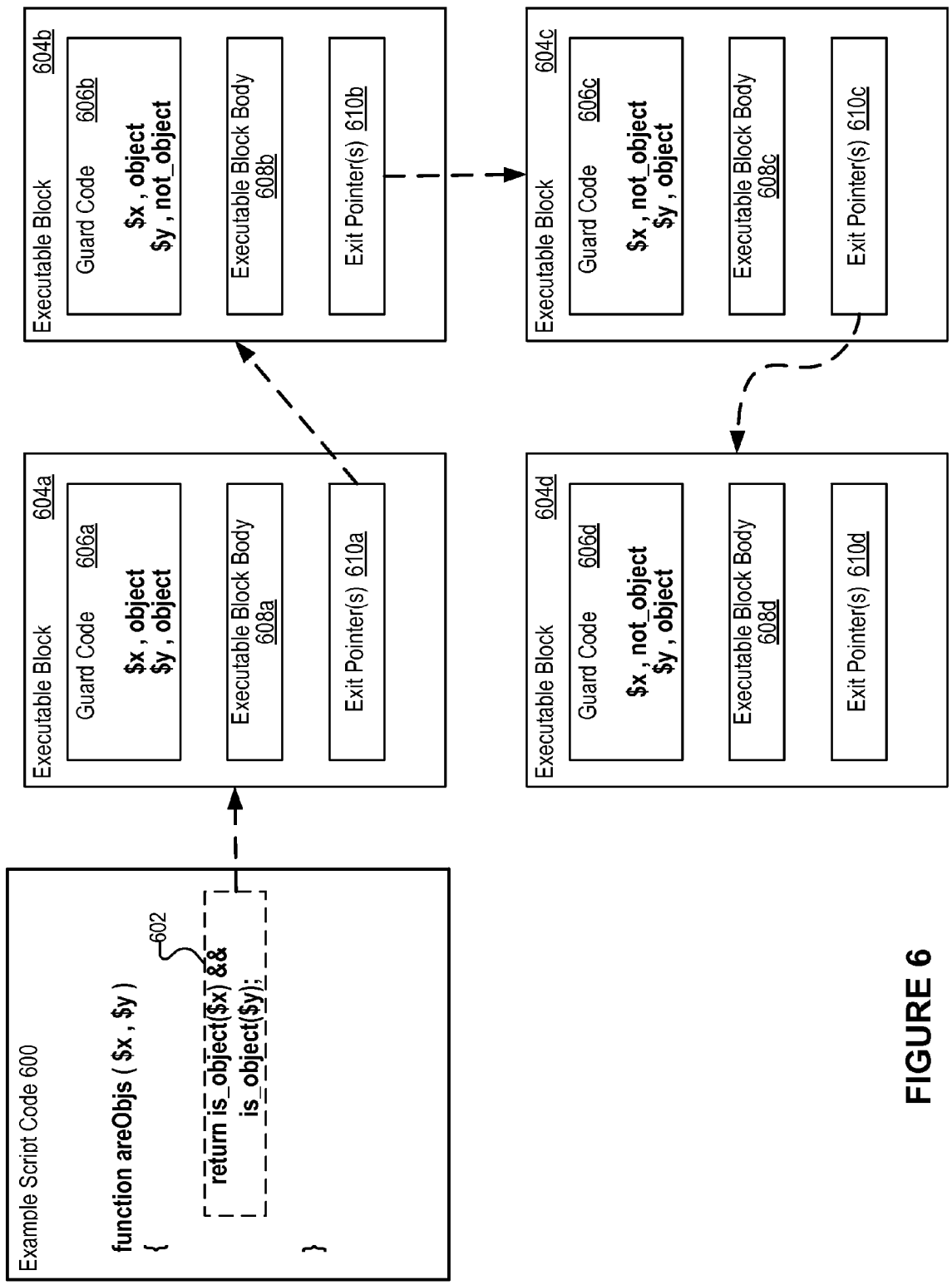
FIG. 6 illustrates an example chain of executable blocks of code in accordance with an embodiment of the invention.

FIG. 6 illustrates an example chain of executable blocks of code in accordance with an embodiment of the invention. As shown in FIG. 6, an example script code 600 can include script code relating to a function areObjs configured to receive input values through parameter variables $x and $y and execute the operation "return is_object($x) && is_object ($y)". When the script code 600 is executed by the execution module 102, the execution module 102 may identify the basic block of script code 602 to be executed, and may further instruct the script compiler module 104 to compile the identified basic block 602 to an executable block of code. Once generated, the execution module 102 can execute the resulting executable block of code and can store the executable block of code to the executable code data store 108 for subsequent reuse during execution of the script.

Over time, the execution of the identified basic block 602 may lead to the execution module 102 invoking the script compiler module 104 multiple times when encountering different script runtime conditions. For example, when the execution module 102 encounters variable values of different data types incompatible with the existing executable blocks, the execution module 102 may invoke the script compiler module 104 for the basic block of code. Invoking the script compiler module 104 multiple times may generating a plurality of executable blocks 604a-604d, each being configured to handle, through variables $x and $y, values of different data types combinations (e.g., $x:int, $y:int; $x:float, $y:float; $x:int, $y:float; $x:float, $y:int; etc.). The resulting executable blocks 604a-604d may be chained, or linked, together. The chaining of the executable blocks 604a-604d may be such that during execution of the identified basic block 602, the execution module 102 may try each executable block 604 in the chain until the variable values provided by variables $x and $y pass the verification of the guard code 606a-606d of one of the executable blocks 604a-604d.

As shown, the executable blocks 604a-604d may be chained together by way of their respective exit pointers 610a-610b. The executable block 604a may be configured such that failure of its guard code 606a may lead to the control flow being transferred to the executable block 604b. For example, the exit pointer 610a may include an exit pointer specifying the address of the executable block 604b. Likewise, the executable block 604b may be configured such that failure of its guard code 606b may lead to the control flow being transferred to the executable block 604c. For instance, the exit pointer 610b may include an exit pointer specifying the address of the executable block 604c. Similarly, the executable block 604c may be configured such that failure of its guard code 606c may lead to the control flow being transferred to the executable block 604d. The exit pointer 610c, for example, may include an exit pointer specifying the address of the executable block 604d.

The executable block 604d may be configured such that failure of its guard code 606d may lead to the control flow being transferred to the script compiler module 104 for generation of a new executable block (not shown) configured to handle the types of variable values being currently provided through variables $x and $y. The exit pointer 610d may, for example, specify the address of executable code for the script compiler module 104. Upon creation of a new executable block, the exit pointer 610d would be modified to specify the address of the newly generated executable block.

In accordance with some embodiments, the criteria verified by the guard code 606a-606d may be relaxed in situations where a given executable block of code can be used and reused with new variable values, in variables $x and $y, having data types different from those of the original variable values under which the given executable block was created. The new variable values may be of data types that share characteristics with the data types of the original variable values. As described herein in further detail, the relaxation of guard code 606a-606d may occur during generation of the executable block by the script compiler module 104. The script compiler module 104 may, for example, relax the guard code 606a-606d based on analysis of the variables $x and $y. For instance, where the analysis of the variables $x and $y shows that both variables $x and $y are non-reference count variables, the guard code 606a-606d can be configured to verify for variable values corresponding to generalized data types. The generalized data type may be broader or more general than the specific data types associated with the variable value under which the executable block was originally created.

As shown, the guard code 606a of the executable block 604a can verify whether the variable $x is an object and whether the variable $y is an object. Where the variables $x and $y are verified by the guard code 606a, the execution module 102 may execute an executable block body 608a of the executable block 604a. Where the variables $x and $y are not verified by the guard code 606a, the execution module 102 may transfer control from the executable block 604a to the executable block 604b.

The guard code 606b of the executable block 604b can verify whether the variable $x is an object and whether the variable $y is not an object. Where the variables $x and $y are verified by the guard code 606b, the execution module 102 may execute an executable block body 608b of the executable block 604b. Where the variables $x and $y are not verified by the guard code 606b, the execution module 102 may transfer control from the executable block 604b to the executable block 604c.

The guard code 606c of the executable block 604c can verify whether the variable $x is not an object and whether the variable $y is an object. Where the variables $x and $y are verified by the guard code 606c, the execution module 102 may execute an executable block body 608c of the executable block 604c. Where the variables $x and $y are not verified by the guard code 606c, the execution module 102 may transfer control from the executable block 604c to the executable block 604d.

The guard code 606d of the executable block 604d can verify for whether the variable $x is not an object and whether the variable $y is not an object. Where the variables $x and $y are verified by the guard code 606d, the execution module 102 may execute an executable block body 608d of the executable block 604d. Where the variables $x and $y are not verified by the guard code 606d, the execution module 102 may transfer control from the executable block 604c to the script compiler module 104 so that the script compiler module 104 can generate another executable block of code configured to handle the current variable values of provided by the variables $x and $y.

In some embodiments, the chain of executable blocks that results from the execution module 102 executing the identified basic block 602 may differ from the chain shown in FIG. 6, and may include different guard code than what is shown in FIG. 6.

Figure 7:
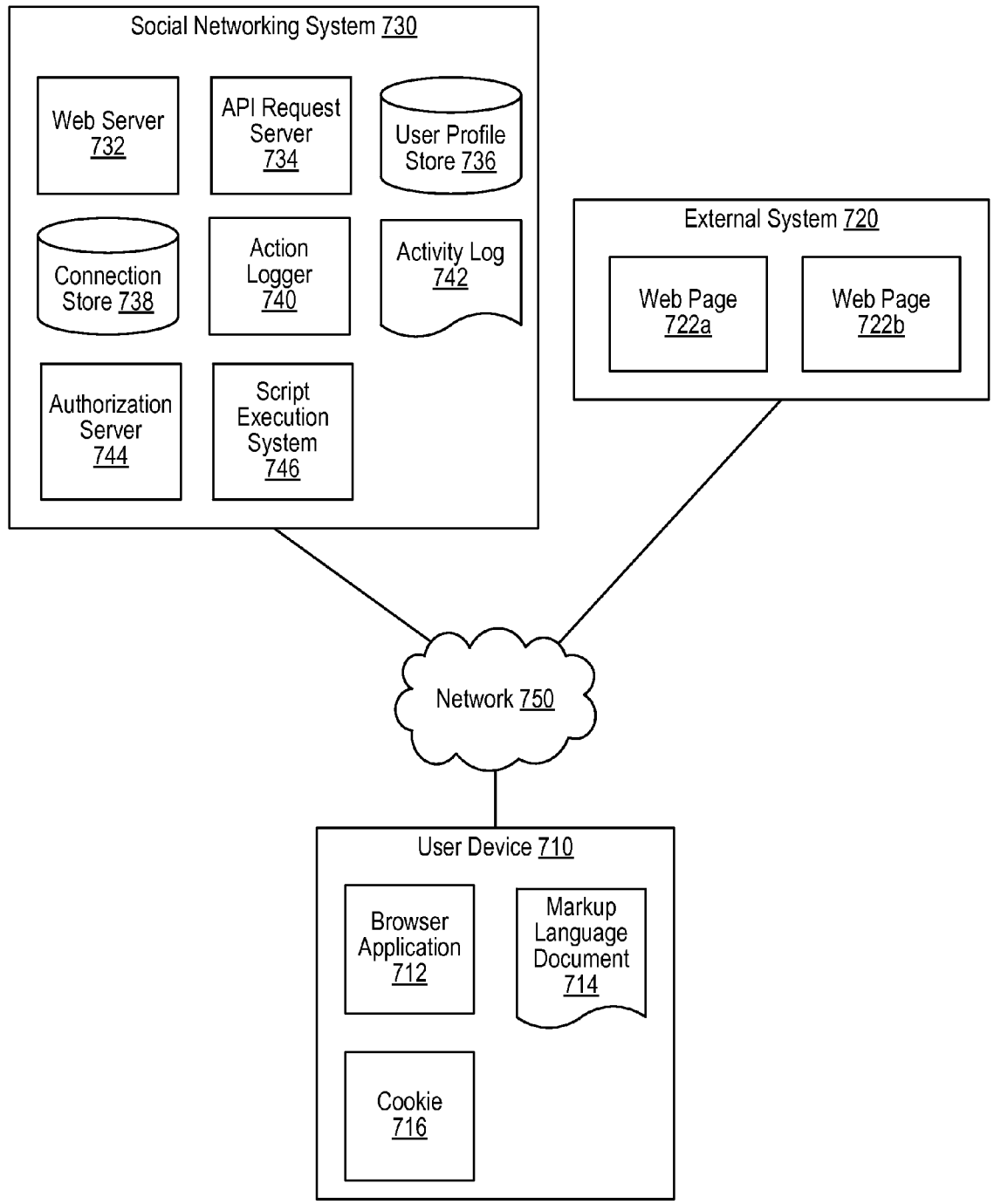
FIG. 7 illustrates an example of a network diagram of system for script execution in a social networking system in accordance with an embodiment of the invention.

FIG. 7 is a network diagram of a system 700 for pruning data by sampling in a social networking system 730 in accordance with an embodiment of the invention. The system 700 includes one or more user devices 710, one or more external systems 720, the social networking system 730, and a network 750. For purposes of illustration, the embodiment of the system 700, shown by FIG. 7, includes a single external system 720 and a single user device 710. However, in other embodiments, the system 700 may include more user devices 710 and more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a MICROSOFT Windows compatible operating system (OS), APPLE OS X, and/or a LINUX distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JAVASCRIPT Object Notation (JSON) data, JSON with padding (JSONP), and JAVASCRIPT data to facilitate data-interchange between the external system 720 and the user device 710. The browser application 712 on the user device 710 may use a JAVASCRIPT compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable customization of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. As described herein in further detail, the social network can be represented by a graph, i.e., a data structure including edges and nodes. Other data structures can also be used to represent the social network, including but not limited to databases, objects, classes, meta elements, files, or any other data structure.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. As discussed herein, the social networking system 730 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 730. As described herein in further detail, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third-party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744, and a script execution system 746. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as JAVA, JAVASCRIPT, FLASH, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

As described above in further detail, the script execution system 746 contains logic that enables execution of a script using incremental compilation at script runtime. The script execution system 746 may be invoked to execute a script based on a request received by a web server 732, which may be received from the user device 710. The script execution system 746 may facilitate just-in-time compilation of script code during execution. According to some embodiments, the script execution system 746 can limit each tracelet to a single basic block of code. The data types of values provided by one or more variables used in the single basic block of code are known by generalized categories, rather than only being known by specific data types. Accordingly, the script execution system 746 may generate guard code for an executable block corresponding to each tracelet, which ensures that values received by the tracelet through the variables are of the data types expected by the tracelet's associated code body, can use generalized data types. The tracelet can contain code body that can handle input values that meet those generalized data types. As noted herein, a generalized data type can be defined according to one or more common characteristics shared by two or more specific data types. Examples of generalized data type categories used can include reference-counted data types, non-reference-counted data types, character data types, numerical types, object data types, and non-object data types.

Figure 8:
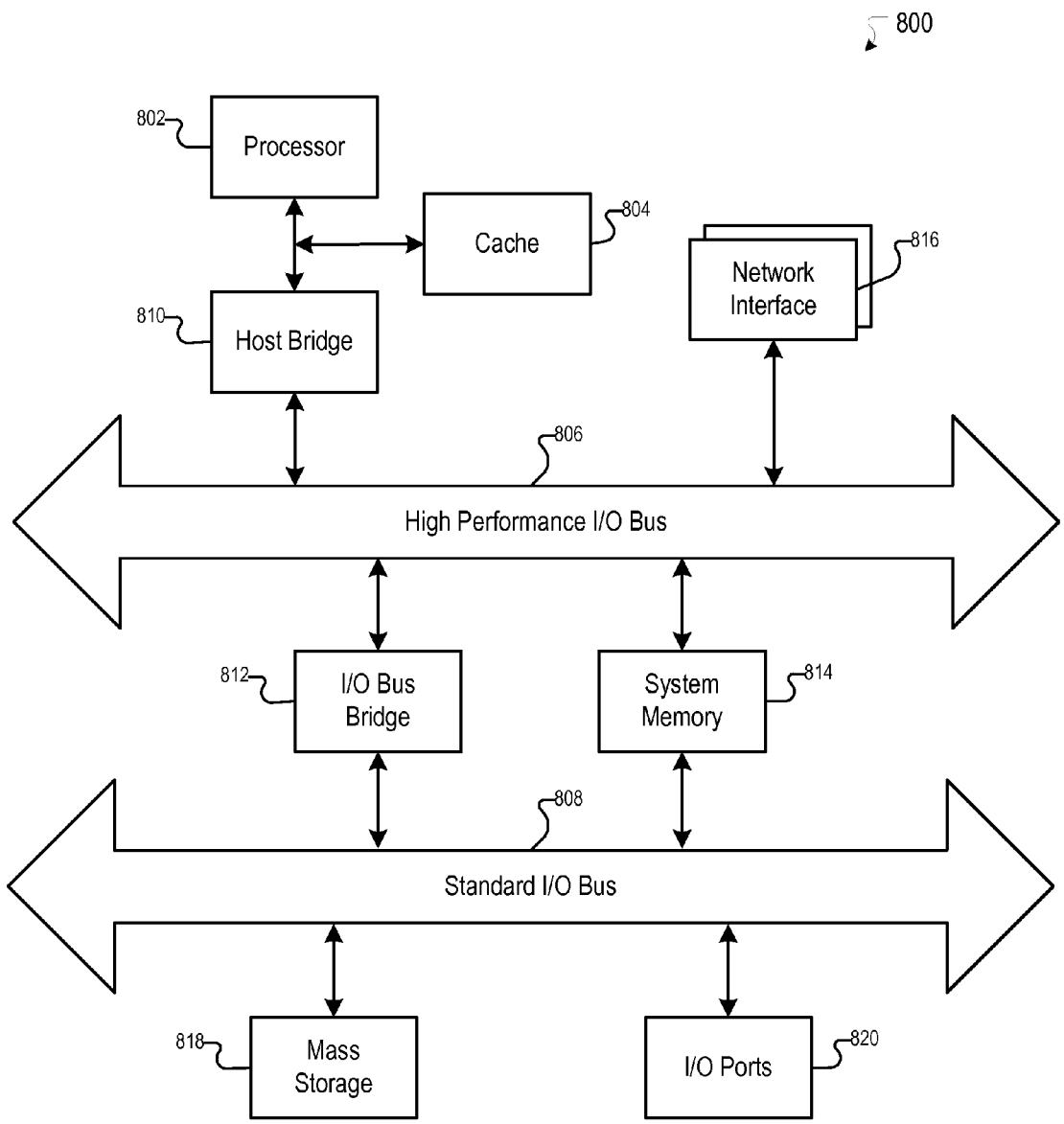
FIG. 8 illustrates a diagram of a computer system in accordance with an embodiment of the invention.

The foregoing processes and features can be implemented by a wide variety of machine and computer system architectures and in a wide variety of network and computing environments. FIG. 8 illustrates an example of a computer system 800 that may be used to implement one or more of the computing devices identified above. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be one of the script execution system 100, the social networking system 730, or a component thereof.

The computer system 800 includes a processor 802, a cache memory 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples the processor 802 to the high performance I/O bus 806, whereas I/O bus bridge 812 couples the two buses 806 and 808 to each other. A system memory 814 and one or more network interfaces 816 couple to the bus 806. The computer system 800 may further include video memory and a display device coupled to the video memory (not shown). Mass storage 818 and I/O ports 820 couple to the bus 808. The computer system 800 may optionally include a keyboard and pointing device, a display device, or other input/output devices (not shown) coupled to the bus 808. Collectively, these elements are intended to represent a broad category of computer hardware systems, including but not limited to computer systems based on the x86-compatible processors manufactured by INTEL Corporation of Santa Clara, Calif., and the x86-compatible processors manufactured by ADVANCED MICRO DEVICES (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System; the APPLE MACINTOSH Operating System, available from Apple Computer Inc. of Cupertino, Calif.; UNIX operating systems; MICROSOFT® Windows® operating systems; BSD operating systems; and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 which, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814, and then accessed and executed by processor 802. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computer system, a request for executing a script;
   identifying, by the computer system, a basic block of code in the script to be executed, the basic block including one or more variables that provide input values to the basic block;
   determining a set of specific data types corresponding to current variable values provided by the variables during current execution of the basic block of code;
   determining, based on analysis of the variables, whether a set of guard code data types corresponding to the current variable values can include one or more generalized data types for the current variable values;
   in response to determining that the set of guard code data types can include one or more generalized data types for the current variable values:
   determining, by the computer system, a set of relaxed guard code data types, the set of relaxed guard code data types including at least one generalized data type rather than a specific data type of the set of specific data types, the at least one generalized data type encompassing the specific data type and being more general than the specific data type; and
   generating, by the computer system, an executable block of code for the basic block of code, the executable block of code including a set of instructions configured to verify whether a set of subsequent variable values provided by the variables during subsequent execution of the basic block of code conforms to the set of relaxed guard code data types rather than the set of specific data types.

2. The computer-implemented method of claim 1, wherein the determining whether the set of guard code data types can include one or more generalized data types comprises determining whether execution of the basic block of code involves modification of a reference count associated with at least one of the variables.

3. The computer-implemented method of claim 1, wherein the determining whether the set of guard code data types can include one or more generalized data types comprises:

translating the basic block of code to intermediate code configured to operate on an evaluation stack; and
determining an effect of the intermediate code on the evaluation stack.

4. The computer-implemented method of claim 3, wherein the intermediate code is byte code.

5. The computer-implemented method of claim 3, wherein the evaluation stack is associated with a virtual machine.

6. The computer-implemented method of claim 3, wherein the evaluation stack is associated with an interpreter.

7. The computer-implemented method of claim 1, wherein the set of instructions are further configured to verify whether the set of subsequent variable values provided by the variables during subsequent execution of the basic block of code conforms to the set of relaxed guard code data types before a portion of the executable block corresponding to the basic block of code is executed.

8. The computer-implemented method of claim 1, wherein if the set of subsequent variable values provided by the variables during subsequent execution of the basic block of code conforms to the set of relaxed guard code data types, the set of instructions are further configured to permit execution of the executable block.

9. The computer-implemented method of claim 1, wherein if the set of subsequent variable values provided by the variables during subsequent execution of the basic block of code does not conform to the set of relaxed guard code data types, the set of instructions are further configured to exit the executable block before the executable block continues further execution.

10. The computer-implemented method of claim 9, wherein the executable block exits to a second executable block corresponding to the basic block of code, the second executable block including a second set of instructions configured to verify whether the set of subsequent variable values provided by the variables during subsequent execution of the basic block of code conforms to a second set of guard code data types for variable values provided by the variables, the second set of guard code data types being different from the set of relaxed guard code data types.

11. The computer-implemented method of claim 10, wherein the second set of guard code data types includes at least one generalized data type encompassing a specific data type of a variable value provided by at least one of the variables.

12. The computer-implemented method of claim 10, wherein the second set of guard code data types is a set of specific data types.

13. The computer-implemented method of claim 9, wherein the executable block exits to a second set of instructions that causes generation of a second executable block different from the executable block, the second executable block being compatible with a second set of data types corresponding to the set of subsequent variable values provided by the variables during subsequent execution of the basic block of code.

14. The computer-implemented method of claim 1, wherein the generalized data type is at least one of a reference-counted data type, a non-reference-counted data type, an object data type, a non-object data type, a numeric object type, a non-numeric data type, a Boolean data type, a non-Boolean data type, a character data type, or a non-character data type.

15. The computer-implemented method of claim 1, wherein the computer-implemented method is performed during just-in-time compilation of the script.

16. The computer-implemented method of claim 1, further comprising storing the executable block of code for subsequent execution of the basic block of code.

17. A computer system comprising:
  at least one processor; and
  a memory storing instructions configured to instruct the at least one processor to perform:
    receiving a request for executing a script;
    identifying a basic block of code in the script to be executed, the basic block including one or more variables that provide input values to the basic block;
    determining a set of specific data types corresponding to current variable values provided by the variables during current execution of the basic block of code;
    determining, based on analysis of the variables, whether a set of guard code data types corresponding to the current variable values can include one or more generalized data types for the current variable values;
    in response to determining that the set of guard code data types can include one or more generalized data types for the current variable values:
      determining a set of relaxed guard code data types, the set of relaxed guard code data types including at least one generalized data type rather than a specific data type of the set of specific data types, the at least one generalized data type encompassing the specific data type and being more general than the specific data type; and
      generating an executable block of code for the basic block of code based, the executable block of code including a set of instructions configured to verify whether a set of subsequent variable values provided by the variables during subsequent execution of the basic block of code conforms to the set of relaxed guard code data types rather than the set of specific data types based on a second set of criteria that is broader than the first set of criteria.

18. A non-transitory computer-storage medium storing computer-executable instructions that, when executed, cause a computer system to perform a computer-implemented method comprising:
  receiving a request for executing a script;
  identifying a basic block of code in the script to be executed, the basic block including one or more variables that provide input values to the basic block;
  determining a set of specific data types corresponding to current variable values provided by the variables during current execution of the basic block of code;
  determining, based on analysis of the variables, whether a set of guard code data types corresponding to the current variable values can include one or more generalized data types for the current variable values;
  in response to determining that the set of guard code data types can include one or more generalized data types for the current variable values:
    determining a set of relaxed guard code data types, the set of relaxed guard code data types including at least one generalized data type rather than a specific data type of the set of specific data types, the at least one generalized data type encompassing the specific data type and being more general than the specific data type; and
    generating an executable block of code for the basic block of code, the executable block of code including a set of instructions configured to verify whether a set of subsequent variable values provided by the variables during subsequent execution of the basic block of code conforms to the set of relaxed guard code data types rather than the set of specific data types.

* * * * *